(12) United States Patent
Brettschneider et al.

(10) Patent No.: US 10,876,418 B2
(45) Date of Patent: Dec. 29, 2020

(54) TURBINE CENTER FRAME HAVING A SPECIFICALLY DESIGNED ANNULAR SPACE CONTOUR

(71) Applicant: MTU Aero Engines AG, Munich (DE)

(72) Inventors: Markus Brettschneider, Karlsfeld (DE); Christoph Lauer, Munich (DE); Rudolf Stanka, Rattenkirchen (DE)

(73) Assignee: MTU Aero Engines AG, Munich (DE)

( * ) Notice: Subject to any disclaimer, the term of this patent is extended or adjusted under 35 U.S.C. 154(b) by 47 days.

(21) Appl. No.: 16/414,910

(22) Filed: May 17, 2019

(65) Prior Publication Data
US 2019/0360347 A1 Nov. 28, 2019

(30) Foreign Application Priority Data
May 24, 2018 (DE) .................. 10 2018 208 151

(51) Int. Cl.
*F01D 9/04* (2006.01)
(52) U.S. Cl.
CPC ........ *F01D 9/042* (2013.01); *F05D 2220/323* (2013.01); *F05D 2240/12* (2013.01)
(58) Field of Classification Search
CPC .......... F01D 5/143; F01D 9/041; F01D 9/042; F05D 2220/323; F05D 2240/12; F05D 2250/713; Y02T 50/60
See application file for complete search history.

(56) References Cited

U.S. PATENT DOCUMENTS 2,974,858 A 3/1961 Koffel
4,677,828 A 7/1987 Matthews
(Continued)

FOREIGN PATENT DOCUMENTS

DE 19650656 C1 6/1998
DE 69423789 T2 7/2000
(Continued)

*Primary Examiner* — Igor Kershteyn
(74) *Attorney, Agent, or Firm* — Davidson, Davidson & Kappel, LLC

(57) ABSTRACT

Described is a turbine center frame for a gas turbine, in particular an aircraft gas turbine, the turbine center frame having a radially inner wall and a radially outer wall bounding an annular space through which hot gas flows and each having a contour facing the annular space, the contours describing an inner annular space curve along the inner wall and an outer annular space curve along the outer wall. At least one vane element extends in the radial direction through the annular space and has an axial leading edge and an axial trailing edge, the vane element having an outer axial width. The outer annular space curve or/and the inner annular space curve have at least one curve section having an inflection point of the respective annular space curve or/and a point of maximum slope of the respective annular space curve, the curve section being located in the region of the leading edge or trailing edge as considered with respect to the outer axial width or/and the inner axial width and having a length projected parallel to the axial direction which length is up to 20% of the respective axial width, and the curve section intersecting the piercing point where the leading edge or the trailing edge pierces the outer wall or the inner wall.

11 Claims, 3 Drawing Sheets

(56) References Cited

U.S. PATENT DOCUMENTS

| | | | |
|---|---|---|---|
| 5,357,744 A * | 10/1994 | Czachor | F01D 9/065 415/134 |
| 5,397,215 A | 3/1995 | Spear et al. | |
| 6,017,186 A | 1/2000 | Hoeger et al. | |
| 7,517,192 B2 | 4/2009 | Hoeger et al. | |
| 7,870,719 B2 * | 1/2011 | Lee | F01D 9/041 60/202 |
| 8,992,172 B2 | 3/2015 | Hoeger et al. | |
| 9,222,437 B2 | 12/2015 | Machnam | |
| 9,534,497 B2 * | 1/2017 | Kuchana | F01D 5/145 |
| 2006/0051200 A1 | 3/2006 | Hoeger et al. | |
| 2006/0288686 A1 * | 12/2006 | Cherry | F01D 9/02 60/226.1 |
| 2010/0040462 A1 | 2/2010 | Praisner et al. | |
| 2011/0225979 A1 * | 9/2011 | Hoeger | F01D 9/04 60/796 |
| 2012/0275922 A1 * | 11/2012 | Praisner | F01D 9/041 416/223 A |
| 2014/0086739 A1 | 3/2014 | Machnam | |
| 2017/0107843 A1 * | 4/2017 | Humhauser | F01D 25/30 |
| 2017/0298747 A1 * | 10/2017 | Hura | F04D 29/584 |
| 2018/0306041 A1 * | 10/2018 | Peters | F01D 9/065 |

FOREIGN PATENT DOCUMENTS

| | | |
|---|---|---|
| DE | 102004042699 | 3/2006 |
| DE | 102004042699 A1 | 3/2006 |
| DE | 102008060847 A1 | 6/2010 |
| EP | 3064706 A1 | 9/2016 |

* cited by examiner

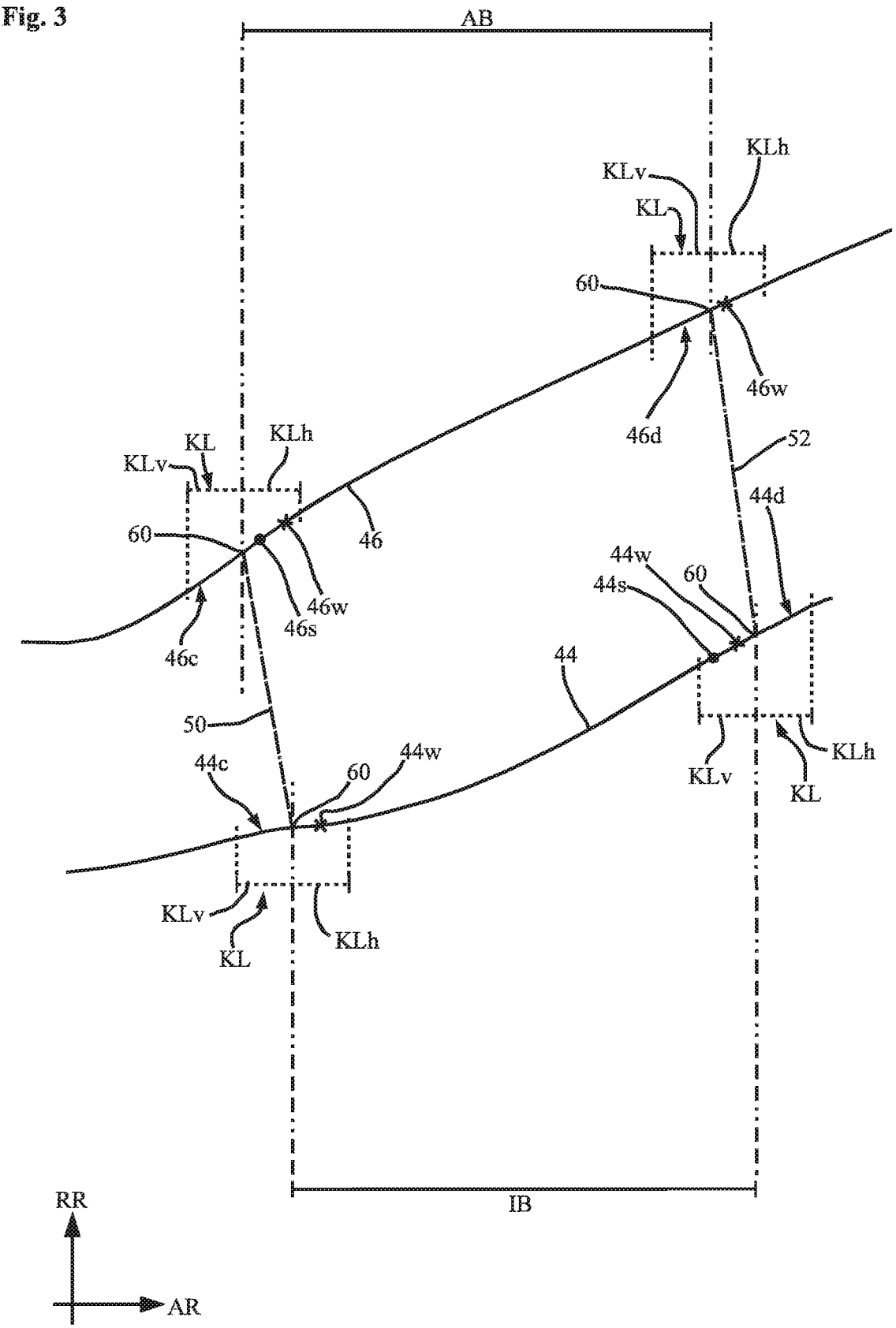

TURBINE CENTER FRAME HAVING A SPECIFICALLY DESIGNED ANNULAR SPACE CONTOUR

This claims the benefit of German Patent Application DE 102018208151.4, filed May 24, 2018 which is hereby incorporated by reference herein.

The present invention relates to a turbine center frame for a gas turbine, in particular an aircraft gas turbine, the turbine center frame having a radially inner wall and a radially outer wall, the inner wall and the outer wall bounding an annular space through which hot gas flows, the inner wall and the outer wall each having a contour facing the annular space, the contours describing an inner annular space curve along the inner wall and an outer annular space curve along the outer wall when viewed in an axial longitudinal section through the turbine center frame, the turbine center frame further having at least one vane element extending in the radial direction through the annular space and having an axial leading edge and an axial trailing edge, the vane element having an outer axial width, taken with respect to the outer wall and measured between the leading edge and the trailing edge, and an inner axial width, taken with respect to the inner wall and measured between the leading edge and the trailing edge.

Directional words such as "axial," "axially," "radial," "radially," and "circumferential" are taken with respect to the machine axis of the gas turbine, unless explicitly or implicitly indicated otherwise by the context.

BACKGROUND

The vane element of such a turbine center frame may be a flow-deflecting or a non-flow-deflecting vane. A flow-deflecting vane is understood to be a vane element that has a significant influence on the direction of flow of the hot gas through the annular space and is not just exposed to the flow without substantially influencing the direction thereof. Typically, at least some of the circumferentially distributed vane elements serve to surround, in an aerodynamically favorable manner, supporting structures extending through the annular space from a hub region to a casing region of a gas turbine and to protect such structures from the hot gas flowing therethrough.

An example of the configuration of an annular space of a turbine center frame is known from US 2014/0086739 A1.

Turbine center frames are typically used between two turbines, and efforts are made to minimize, to the extent possible, their axial length to thereby save weight and space. When the axial length of a turbine center frame is reduced, the outer wall and the inner wall will extend at a greater inclination. This involves the risk of flow separations occurring in the region of the outer wall or inner wall.

SUMMARY OF THE INVENTION

It is an object of the present invention to provide a turbine center frame whose axial length can be minimized while minimizing the risk of flow separations occurring along the wall bounding the annular space.

The present invention provides a turbine center frame and a gas turbine having such a turbine center frame.

Thus, there is provided a turbine center frame for a gas turbine, in particular an aircraft gas turbine, the turbine center frame having
a radially inner wall;
a radially outer wall;
the inner wall and the outer wall bounding an annular space through which hot gas flows, the inner wall and the outer wall each having a contour facing the annular space, the contours describing an inner annular space curve along the inner wall and an outer annular space curve along the outer wall when viewed in an axial longitudinal section through the turbine center frame;
the turbine center frame further having at least one vane element extending in the radial direction through the annular space and having an axial leading edge and an axial trailing edge, the vane element having an outer axial width, taken with respect to the outer wall and measured between the leading edge and the trailing edge, and an inner axial width, taken with respect to the inner wall and measured between the leading edge and the trailing edge.

It is further provided that the outer annular space curve or/and the inner annular space curve have at least one curve section having an inflection point of the respective annular space curve or/and a point of maximum slope of the respective annular space curve, the curve section being located in the region of the leading edge or trailing edge as considered with respect to the outer axial width or/and the inner axial width and having a length projected parallel to the axial direction which length is up to 20% of the respective axial width, and the curve section intersecting the piercing point where the leading edge or the trailing edge pierces the outer wall or the inner wall.

It has been found that by providing inflection points and points of maximum slope in the leading and trailing edge regions, the annular space curves can be optimally configured with regard to a shortened axial length. The provision of the inflection points and points of maximum slope in the vane edge regions also prevents the flow from separating along the annular space walls. Thus, at least one inflection point of the outer annular curve or inner annular curve is located in the region of the leading edge and trailing edge, respectively. Alternatively or additionally, at least one point of maximum slope of the outer annular curve or inner annular curve is located in the region of the leading edge and trailing edge, respectively.

An inflection point of an annular space curve is understood to be the point along the annular space curve at which the curvature of the annular space curve changes from convex to concave or vice versa. In this connection, the terms "convex" and "concave" may be used with respect to a hub of the turbine center frame.

The projected length of the curve section may have a forward portion located upstream of the leading edge or trailing edge and a rearward portion located downstream of the leading edge or trailing edge, the forward portion and the rearward portion being substantially equal in length. In other words, the forward portion and the rearward portion have the same length with respect to the piercing points where the leading edge and the trailing edge pierce the outer wall and the inner wall, respectively. In particular, the forward portion and the rearward portion have a length of up to 10% of the inner and outer axial widths of the vane element, respectively.

The outer annular curve may have a first inflection point in the region of the leading edge and a second inflection point in the region of the trailing edge. Furthermore, the inner annular curve may have a third inflection point in the region of the leading edge and a fourth inflection point in the region of the trailing edge. Thus, the annular curves may be configured such that their respective inflection points, in particular all inflection points, are provided only in the region of the leading edge and trailing edge, respectively, in particular in the region of the corresponding curve section having the projected length of 20% of the axial width of the vane element.

The point of maximum slope of the outer annular curve may be provided in the region of the leading edge or in the region of the trailing edge. Alternatively or additionally, the point of maximum slope of the inner annular curve may be provided in the region of the trailing edge. Accordingly, an annular space may be configured such that its points of maximum slope are located at three positions which are all in the region of the leading edge and trailing edge, respectively. In this connection, the inner annular space curve has no point of maximum slope in particular at the leading edge.

The present invention further relates to a gas turbine, in particular an aircraft gas turbine, having at least two turbines arranged in series, in particular a high-pressure turbine and a low-pressure turbine or, in particular, a high-pressure turbine, a medium-pressure turbine and a low-pressure turbine, with an above-described turbine center frame being installed between two successive turbines, in particular between the high-pressure turbine and the downstream low-pressure turbine or medium-pressure turbine in such a way that hot gas discharging from one turbine is conveyed through the annular space to the downstream turbine.

BRIEF DESCRIPTION OF THE DRAWINGS

The present invention will now be described with reference to the accompanying figures by way of example and not by way of limitation.

FIG. 3 is a simplified schematic illustration of the annular space curves of the annular space shown in FIG. 2.

DETAILED DESCRIPTION

Figure 1:
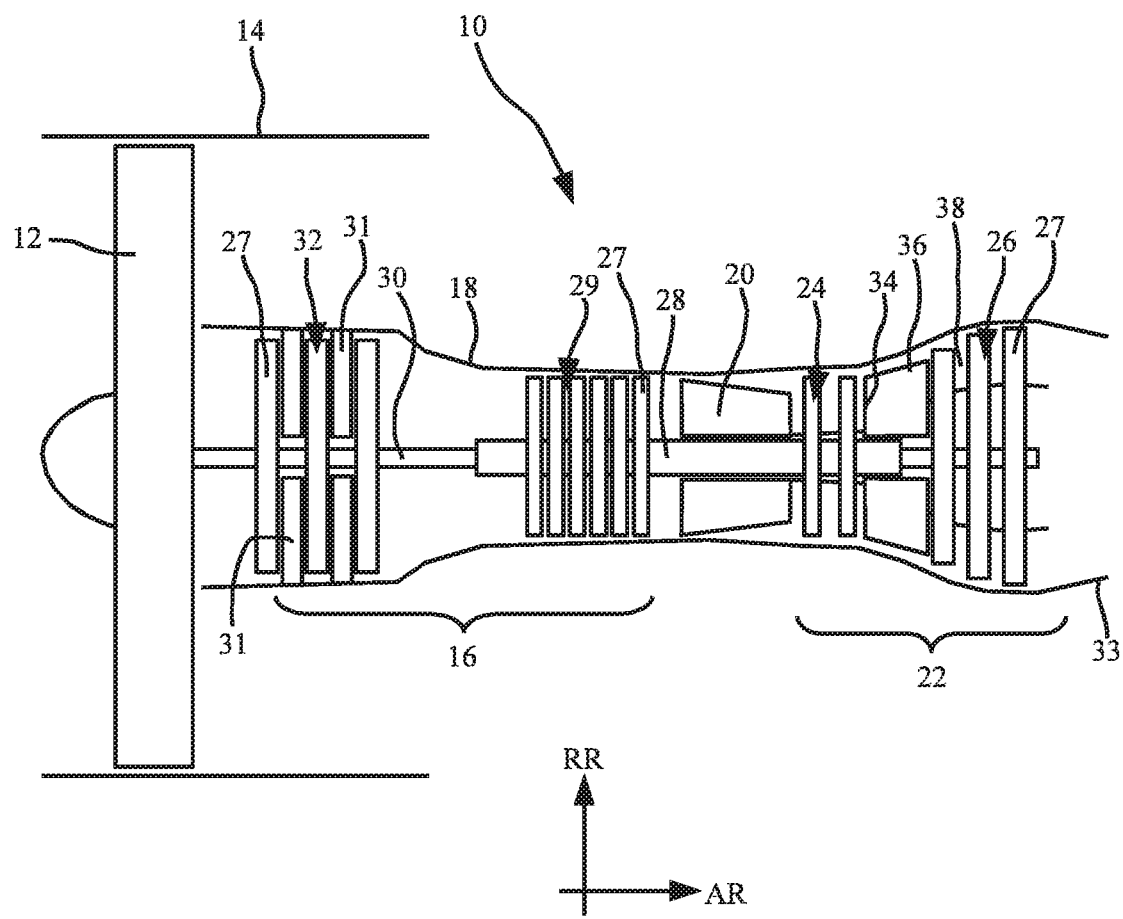
FIG. 1 is a simplified schematic representation of an aircraft gas turbine.

FIG. 1 shows, in simplified schematic form, an aircraft gas turbine 10, illustrated, merely by way of example, as a turbofan engine. Gas turbine 10 includes a fan 12 that is surrounded by a schematically indicated casing 14. Disposed downstream of fan 12 in axial direction AR of gas turbine 10 is a compressor 16 that is accommodated in a schematically indicated inner casing 18 and may include a single stage or multiple stages. Disposed downstream of compressor 16 is combustor 20. Hot exhaust gas discharging from the combustor then flows through subsequent turbine 22, which may be single-stage or multi-stage. In the present example, turbine 22 includes a high-pressure turbine 24 and a low-pressure turbine 26. A hollow shaft 28 connects high-pressure turbine 24 to compressor 16, in particular a high-pressure compressor 29, so that they are jointly driven or rotated. Another shaft 30 located further inward in the radial direction RR of the turbine connects low-pressure turbine 26 to fan 12 and to a here low-pressure compressor 32 so that they are jointly driven or rotated. Disposed downstream of turbine 22 is an exit casing 33, which is only schematically indicated here.

In the illustrated example of an aircraft gas turbine 10, a turbine center frame 34 is disposed between high-pressure turbine 24 and low-pressure turbine 26 and extends around shafts 28, 30. Hot exhaust gases from high-pressure turbine 24 flow through turbine center frame 34 in its radially outer region 36. The hot exhaust gas then flows into an annular space 38 of low-pressure turbine 26. Compressors 28, 32 and turbines 24, 26 are represented, by way of example, by rotor blade rings 27. For the sake of clarity, the usually present stator vane rings 31 are shown, by way of example, only for compressor 32.

The following description of an embodiment of the invention relates in particular to turbine center frame 34 and the annular space 38 formed therein.

Figure 2:
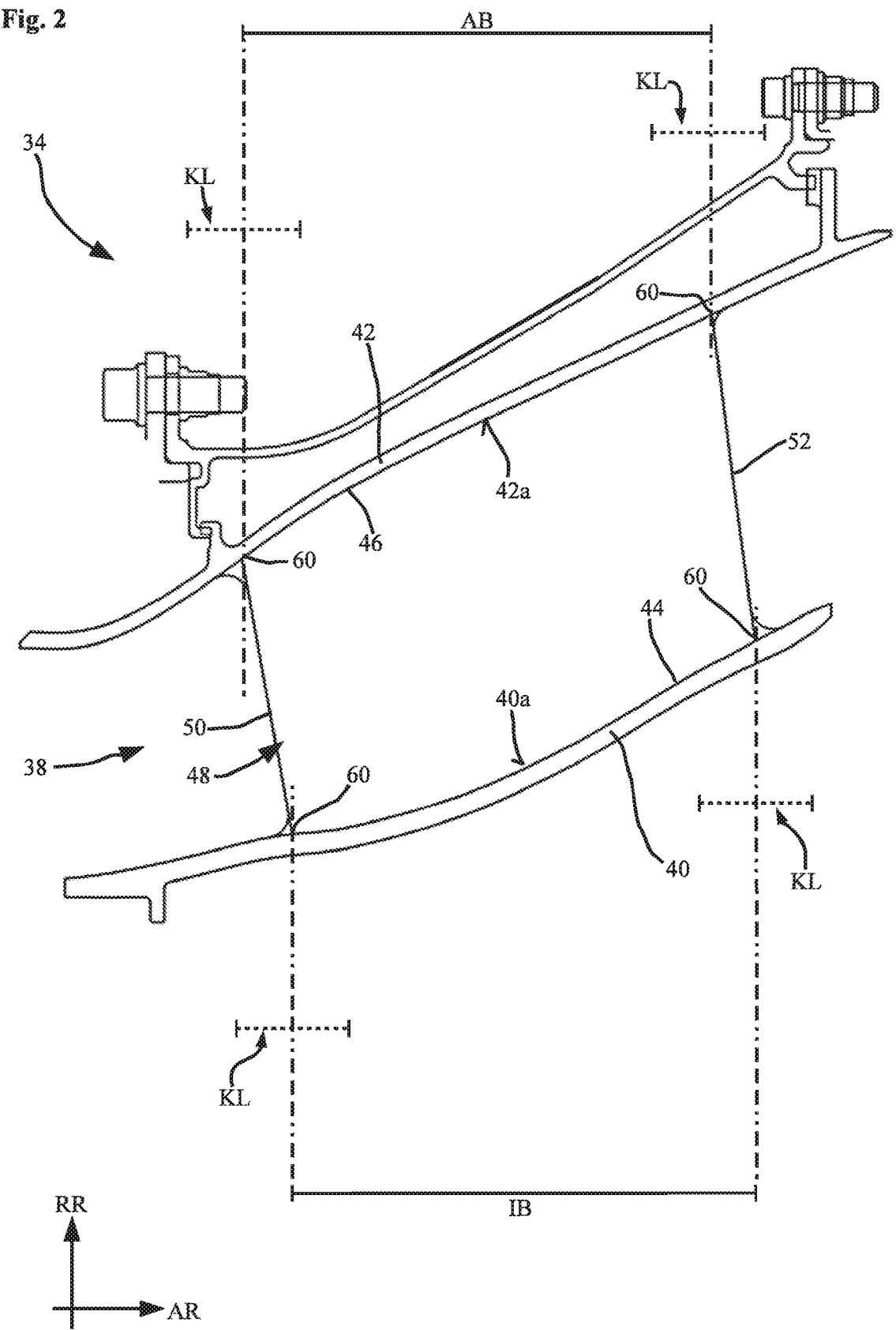
FIG. 2 is a simplified and schematic cross-sectional view showing an annular space of a turbine center frame.

FIG. 2 shows a longitudinal section through the annular space 38 of a turbine center frame 34. The cross-sectional plane is defined by axial direction AR and radial direction RR. Turbine center frame 34 includes a radially inner wall 40 and a radially outer wall 42. Annular space 38, through which hot gas flows, is bounded by inner wall 40 and outer wall 42. Inner wall 40 and outer wall 42 each have a respective contour 40a, 42a facing the annular space 38. The two contours 40a, 42a describe an inner annular space curve 44 along inner wall 40 and an outer annular space curve 46 along outer wall 42 when viewed in an axial longitudinal section through the turbine center frame.

FIG. 2 further shows a vane element 48 extending in radial direction RR through annular space 38. Vane element 48 has an axial leading edge 50 and an axial trailing edge 52. It can also be seen in FIG. 2 that vane element 48 has an outer axial width AB, taken with respect to outer wall 42 and measured between leading edge 50 and trailing edge 52, and an inner axial width IB, taken with respect to inner wall 40 and measured between leading edge 50 and trailing edge 52. It should be noted that a plurality of vane elements 48 are arranged circumferentially around the turbine center frame.

In FIG. 3, inner annular curve 44 and outer annular curve 46 are represented as single lines. Furthermore, inner axial width IB and outer axial width AB of vane element 48 are indicated by dash-dot lines, as known from FIG. 2.

With regard to the configuration of annular space contours 42a, 44a, outer annular space curve 46 or/and inner annular space curve 44 has/have at least one curve section 44c, 44d, 46c, 46d having an inflection point 44w, 46w of the respective annular space curve 44, 46. Alternatively or additionally, the curve section may have a point of maximum slope 44s, 46s of the respective annular space curve 44, 46. Curve section 44c, 44d, 46c, 46d is located in the region of leading edge 50 or trailing edge 52 as considered with respect to outer axial width AB or/and inner axial width IB. Moreover, curve section 44c, 44d, 46c, 46d has a length KL projected parallel to axial direction AR which length is up to 20% of the respective axial width AB or IB. The respective curve section 44c, 44d, 46c, 46d intersects a piercing point 60 where leading edge 50 or trailing edge 52 pierces radially outer wall 42 or radially inner wall 40.

The projected length KL of the respective curve section 44c, 44d, 46c, 46d may have a forward portion KLv located upstream of leading edge 50 or trailing edge 52 and a rearward portion KLh located downstream of leading edge 50 or trailing edge 52, the forward portion KLv and the rearward portion KLh being substantially equal in length. In other words, inflection points 44w, 46w or/and points of maximum slope 44s, 46s are located within a region spaced from the respective piercing point 60 by no more than 10% of the respective axial width AB or IB at the relevant position (on the casing or hub).

As can be seen in the view of FIG. 3, inflection points 44w, 46w may be provided in the region of leading edge 50 and at the same time in the region of trailing edge 52. However, it should be noted that it is also conceivable that an inflection point 44w, 46w may be provided in less than the illustrated four curve sections 44c, 44d, 46c, 46d. In particular, such an inflection point may be present in only one of curve sections 44c, 44d, 46c, 46d. This is also true for the points of maximum slope 44s, 46s. In this connection, it should be noted, however, that typically no point of maximum slope 44s of inner annular space curve 44 is present in curve section 44c.

LIST OF REFERENCE NUMERALS 10 aircraft gas turbine
12 fan
14 casing
16 compressor
18 inner casing
20 combustor
22 turbine
24 high-pressure turbine
26 low-pressure turbine
27 rotor blade ring
28 hollow shaft
29 high-pressure compressor
30 shaft
31 stator vane ring
32 low-pressure compressor
33 exit casing
34 turbine center frame
36 outer region
38 annular space
40 radially inner wall
40a contour of the radially inner wall
42 radially outer wall
42a contour of the radially outer wall
44 inner annular space curve
44c, 44d curve section
44s point of maximum slope
44w inflection point
46 outer annular space curve
46c, 46d curve section
46s point of maximum slope
46w inflection point
48 vane element
50 leading edge
52 trailing edge
60 piercing point
AR axial direction
KL projected length of the curve section
KLh rearward portion
KLh forward portion
RR radial direction

What is claimed is:

1. A turbine center frame for a gas turbine, the turbine center frame comprising:
   a radially inner wall;
   a radially outer wall;
   the inner wall and the outer wall bounding an annular space, hot gas capable of flowing through the annular space, the inner wall and the outer wall each having a contour facing the annular space, the contours describing an inner annular space curve along the inner wall and an outer annular space curve along the outer wall when viewed in an axial longitudinal section through the turbine center frame;
   at least one vane element extending in the radial direction through the annular space and having an axial leading edge and an axial trailing edge, the vane element having an outer axial width, taken with respect to the outer wall and measured between the leading edge and the trailing edge, and an inner axial width, taken with respect to the inner wall and measured between the leading edge and the trailing edge,
   wherein the outer annular space curve or the inner annular space curve has at least one curve section having an inflection point of the respective outer or inner annular space curve or a point of maximum slope of the respective outer or inner annular space curve, the curve section being located in a region of the leading edge or trailing edge as considered with respect to the outer axial width or the inner axial width and having a length projected parallel to the axial direction, the length being up to 20% of the respective axial width, and the curve section intersecting the piercing point where the leading edge or the trailing edge pierces the outer wall or the inner wall.

2. The turbine center frame as recited in claim 1 wherein the projected length of the curve section has a forward portion located upstream of the leading edge or the trailing edge and a rearward portion located downstream of the leading edge or the trailing edge, the forward portion and the rearward portion being substantially equal in length.

3. The turbine center frame as recited in claim 1 wherein the outer annular curve has a first inflection point in the region of the leading edge and a second inflection point in the region of the trailing edge.

4. The turbine center frame as recited in claim 2 wherein the inner annular curve has a third inflection point in the region of the leading edge and a fourth inflection point in the region of the trailing edge.

5. The turbine center frame as recited in claim 1 wherein the inner annular curve has a first inflection point in the region of the leading edge and a second inflection point in the region of the trailing edge.

6. The turbine center frame as recited in claim 1 wherein a point of maximum slope of the outer annular curve is provided in the region of the leading edge or in the region of the trailing edge.

7. The turbine center frame as recited in claim 1 wherein a point of maximum slope of the inner annular curve is provided in the region of the trailing edge.

8. An aircraft gas turbine comprising the turbine center frame as recited in claim 1.

9. A gas turbine comprising at least two turbines arranged in series and a turbine center frame as recited in claim 1 being installed between two successive turbines of the at least two turbines in such a way that the hot gas discharging from one turbine of the two successive turbines is conveyable through the annular space to a downstream turbine of the two successive turbines.

10. The gas turbine as recited in claim 9 wherein the least two turbines include a high-pressure turbine and a low-pressure turbine.

11. The gas turbine as recited in claim 10 wherein the least two turbines include a medium-pressure turbine.

* * * * *